United States Patent
Langston et al.

(10) Patent No.: US 9,168,887 B2
(45) Date of Patent: Oct. 27, 2015

(54) VALVE FOR INFLATION AND DEFLATION OF AIR BAGS AND METHOD OF USE THEREOF

(71) Applicant: International Dunnage, LLC, Thunderbolt, GA (US)

(72) Inventors: Lonnie Langston, Port Isabel, TX (US); Cengiz Cesur, Istanbul (TR)

(73) Assignee: INTERNATIONAL DUNNAGE, LLC, Thunderbolt, GA (US)

(*) Notice: Subject to any disclaimer, the term of this patent is extended or adjusted under 35 U.S.C. 154(b) by 0 days.

(21) Appl. No.: 14/547,597

(22) Filed: Nov. 19, 2014

(65) Prior Publication Data

US 2015/0068642 A1   Mar. 12, 2015

Related U.S. Application Data

(62) Division of application No. 13/283,646, filed on Oct. 28, 2011, now Pat. No. 8,919,731.

(51) Int. Cl.
*B60R 21/26* (2011.01)
*F16K 15/20* (2006.01)

(52) U.S. Cl.
CPC ............. *B60R 21/26* (2013.01); *F16K 15/20* (2013.01); *B60R 2021/26094* (2013.01)

(58) Field of Classification Search
CPC ..... F16K 15/20; F16K 15/202; F16K 15/205; F16K 15/207; B60R 21/26; B60R 21/2021; B60R 21/26094

USPC ............ 251/95, 100, 149.6, 149.9; 137/223, 137/232, 234.5; 141/10, 114
See application file for complete search history.

(56) References Cited

U.S. PATENT DOCUMENTS

| | | | | |
|---|---|---|---|---|
| 2,552,053 A * | 5/1951 | Miller | ........................ | 220/315 |
| 2,930,397 A * | 3/1960 | Herman | ........................ | 137/382 |
| 3,590,851 A * | 7/1971 | Bogossian et al. | ............ | 137/223 |
| 4,788,729 A * | 12/1988 | Walker | ........................ | 5/711 |
| 5,082,244 A * | 1/1992 | Krier et al. | ................ | 251/149.6 |
| 5,871,031 A * | 2/1999 | Greinacher | ............ | 137/599.08 |
| 5,941,272 A * | 8/1999 | Feldman | ........................ | 137/223 |
| 5,971,016 A * | 10/1999 | Wass et al. | ................... | 137/541 |
| 6,089,251 A * | 7/2000 | Pestel | ........................ | 137/234.5 |
| 7,051,753 B1 * | 5/2006 | Caires et al. | .................. | 137/232 |
| 7,055,794 B1 * | 6/2006 | Tang | ........................ | 251/82 |
| 7,063,102 B2 * | 6/2006 | Lin | ........................ | 137/223 |
| 7,066,442 B2 * | 6/2006 | Rose | ........................ | 251/149.8 |
| 7,195,029 B2 * | 3/2007 | Wass | ........................ | 137/223 |
| 7,410,145 B1 * | 8/2008 | Elze et al. | ........................ | 251/100 |

* cited by examiner

*Primary Examiner* — Timothy L Maust
(74) *Attorney, Agent, or Firm* — Mathew L. Grell; Balser & Grell IP Law

(57) ABSTRACT

A valve for inflation and deflation of an air bag that is operable to allow air pressure to open the valve to allow air to enter the air bag with subsequent sealing of the valve upon removal of the air pressure source. For deflation, a common coin is insertable into the valve insert which is subsequently turned into a locked-open position, allowing egress of the air within the air bag.

4 Claims, 4 Drawing Sheets

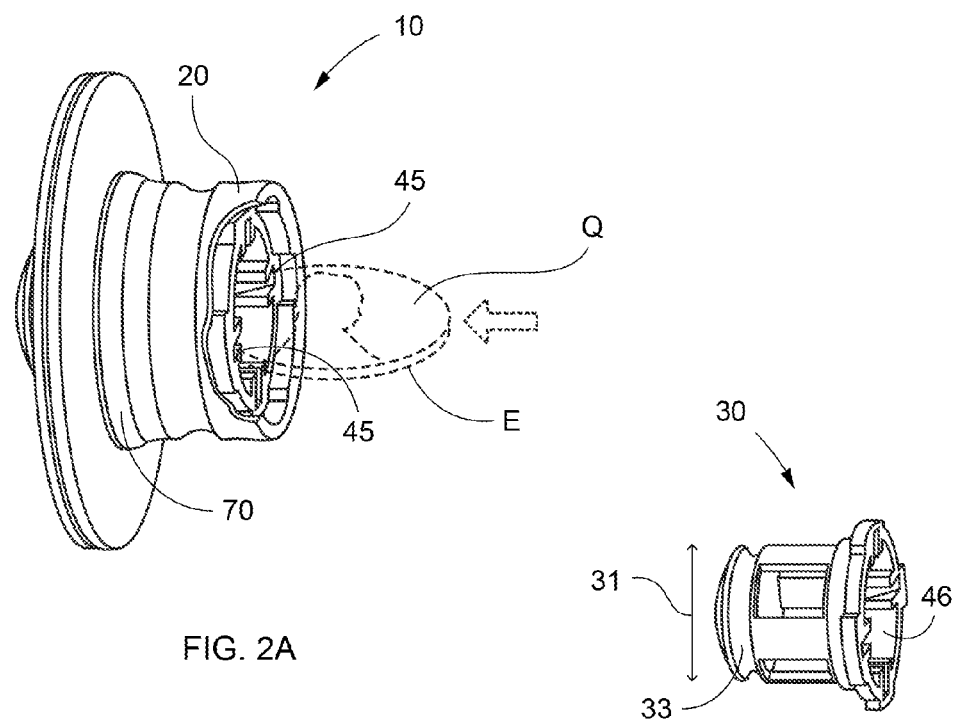
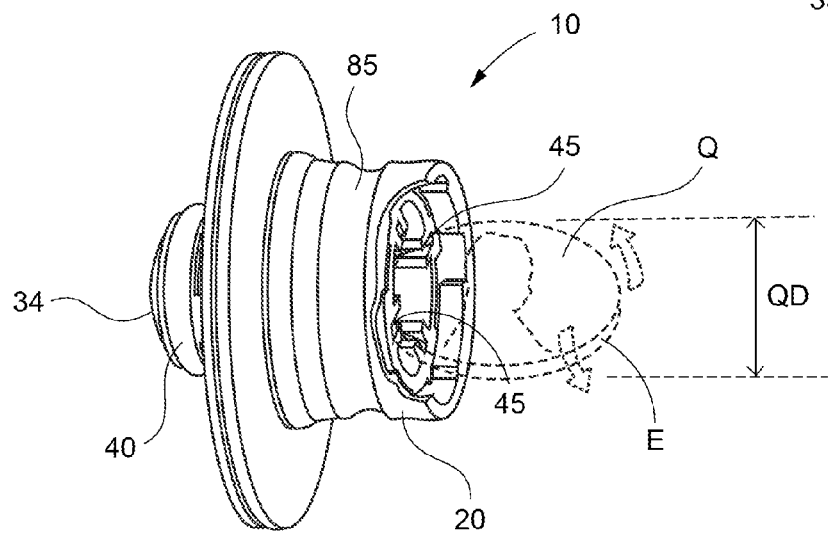

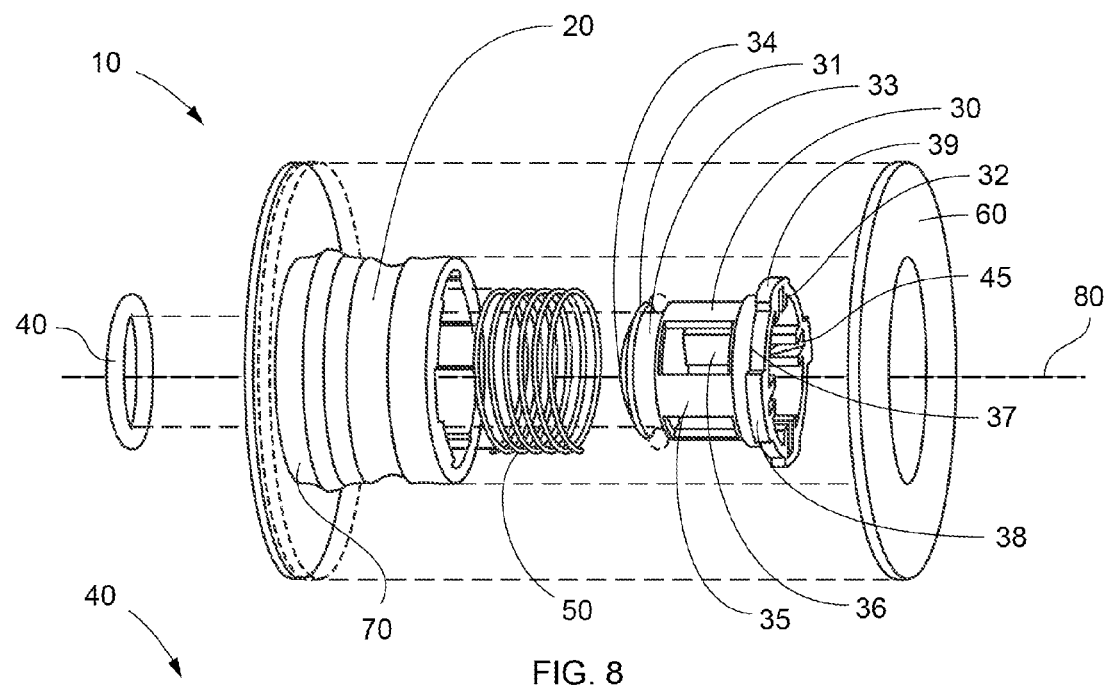
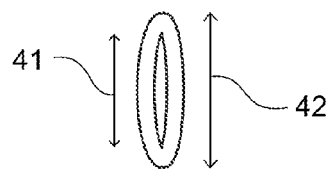
FIG. 3
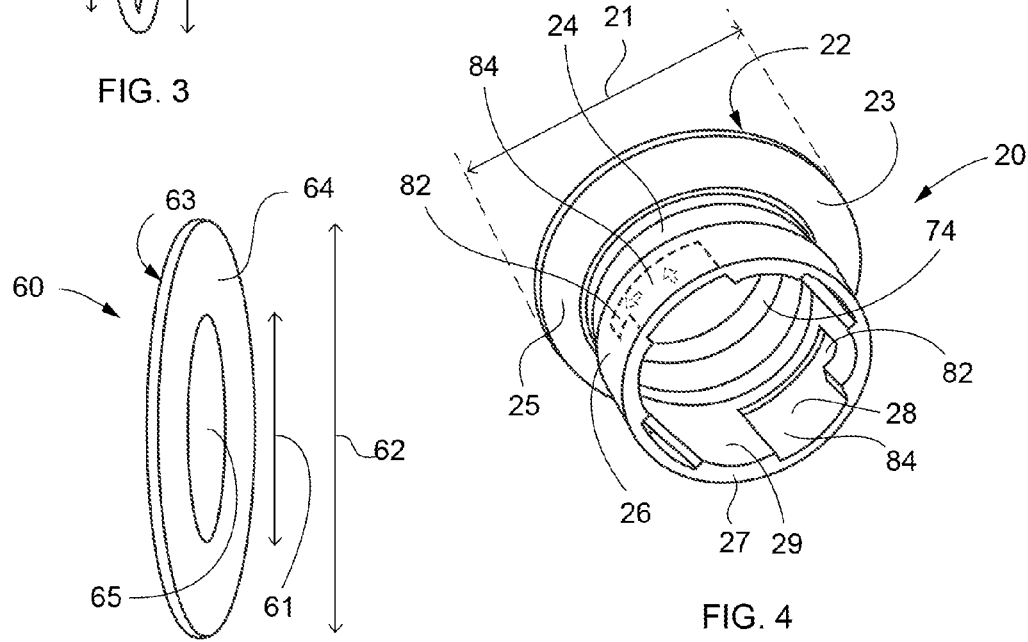

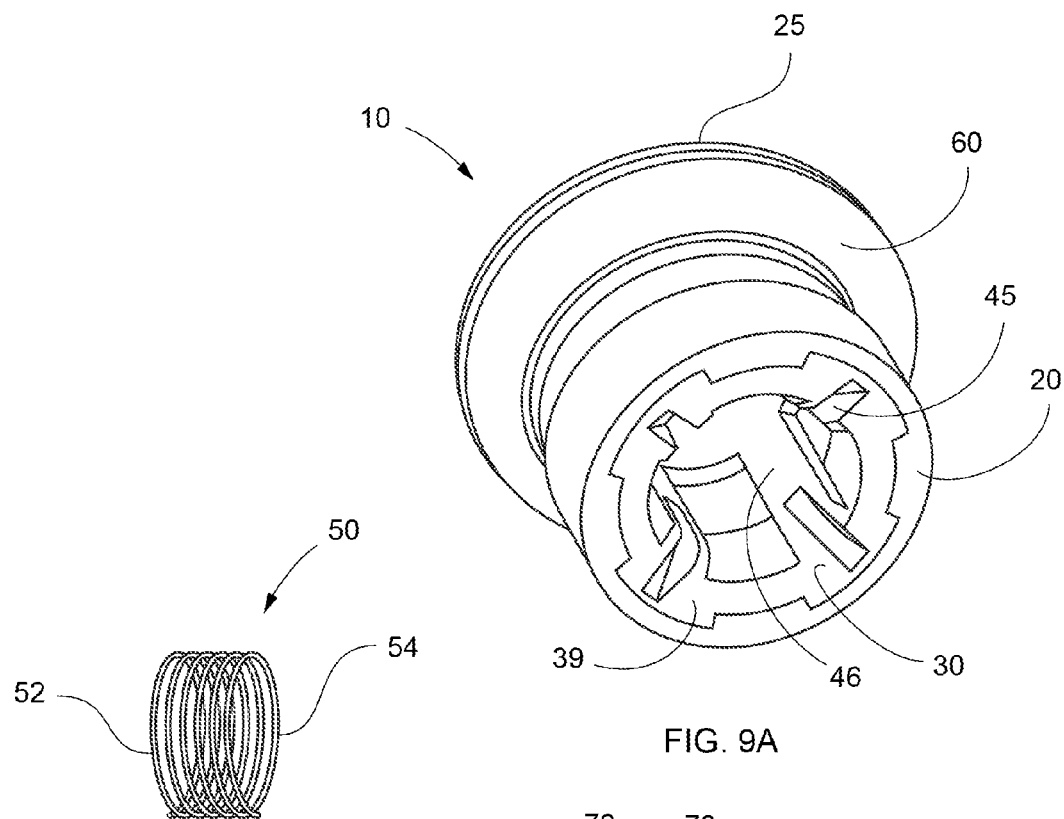
FIG. 9A
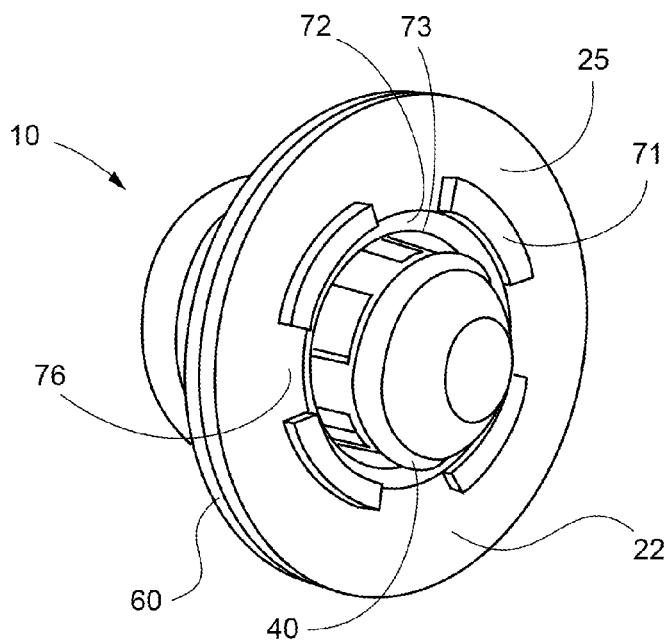
FIG. 7
FIG. 9B

VALVE FOR INFLATION AND DEFLATION OF AIR BAGS AND METHOD OF USE THEREOF

CROSS-REFERENCE TO RELATED APPLICATIONS

To the full extent permitted by law, the present United States Non-provisional patent application, is a Divisional of, and hereby claims priority to and the full benefit of U.S. Non-provisional application entitled "Valve for Inflation and Deflation of Air Bags and Method of Use Thereof," having assigned Ser. No. 13/283,646, filed on Oct. 28, 2011, incorporated herein by reference in its entirety.

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The present invention relates generally to fluid valves, and more specifically to a valve for inflation and deflation of an air-containing bag.

2. Description of Related Art

Goods are shipped all over the world in a variety of containers. The goods may travel via air, sea or land. Thus, the container might be, without limitation, an aircraft, ship, railcar, road vehicle such as a trailer truck, or a shipping container within any of these.

During transit, goods are subject to forces that can cause movement within their container. Aircraft are buffeted by winds, as are rail and road vehicles. Ships are at the mercy of swelling seas. Additionally, forces are exerted when vehicles turn, or in some cases, move up and down. Such forces, if uncontained, may cause destruction of, and/or damage to, the goods being transported.

While goods may be packed together tightly to reduce destruction from movement caused by external forces, packages are often of sizes that are different, or even irregular, and attempting to securely stack such packages in a container is often difficult. Void spaces within the containers provide the opportunity for motion of packages.

Accordingly, it is typical to fill gaps between stacked packages with air cushioning bags that can be inflated to a selected size to restrain the load in place. Once a location for delivery of the packages has been reached, the air cushioning bags must be deflated to allow access for removal of the goods from the container.

One previous approach to overcoming the above-referenced problem is a pressure relief valve that allows for removal of excess pressure from an air-containing device. However, while such a device works well to expel excess air, it opens only to expel air, not to allow air into the air bag.

Other devices are spring loaded, wherein pressure opens the valve, but seal automatically once pressure is released. However, in order to vent the air bag, it is necessary to depress, and inconveniently hold, a portion of the valve open to permit egress of the air within the air bag.

Yet other devices allow for locking the device in an open position to allow egress of the air contained in the air bag. However, such devices often act against a spring and are difficult to manually turn without a specific tool designed for turning the insert within the body of the device.

Therefore, it is readily apparent that there is a need for an air bag valve that allows inflation and deflation, and that is readily operable with simple everyday ubiquitous tools.

BRIEF SUMMARY OF THE INVENTION

Briefly described, in a preferred embodiment, the present invention overcomes the above-mentioned disadvantages and meets the recognized need for such a device by providing a valve for inflation and deflation of an air bag that is operable to allow air pressure to open the valve to allow air to enter the air bag with subsequent sealing of the valve upon removal of the air pressure source. For deflation, a common coin is insertable into the valve insert which is subsequently turned into a locked-open position, allowing egress of the air within the air bag.

According to its major aspects and broadly stated, the present invention in its preferred form is a valve for inflation and deflation of air bags comprising a body and an insert with a first end and at least two diametrically-opposed slots at a second end. The insert is disposed within and slidably movable within the body, and is dimensioned to receive a turning tool having a circular edge that cooperatively engages the diametrically-opposed slots, such as, for exemplary purposes only, a quarter dollar. The valve has a longitudinal axis, and the diametrically-opposed slots form an angle of approximately forty-five degrees from the axis. The body has a barrel section and the turning tool has a diameter. The interior of the barrel section is dimensioned greater than, and approximately the same as, the diameter of the turning tool. The valve further comprises an o-ring having an inside and an outside diameter. The o-ring is removably secured to the insert, being disposed in a groove at the first end of the insert. A spring is slidably disposed between the body and the insert. The body comprises a ledge that defines the bag end of the body, the ledge having an inner diameter disposed at the bag end of the body. The outside diameter of the o-ring is greater than the inner diameter of the body ledge.

The body has an inside surface and has "L"-shaped grooves formed of leg and foot portions. The "L"-shaped grooves are disposed on the inside surface. The insert comprises a flange with flange extensions that cooperatively engage the foot portions of the "L"-shaped grooves. The bag end of the body comprises a flange having raised ridges on the bottom thereof and a chamfer that extends outwardly from the inner diameter. The raised ridges on the flange bottom keep the valve from being sealed off by contact between the fabric of the air bag and the valve flange bottom. The apparatus also comprises an air impervious inflatable air bag pouch to which the valve is sealed, such as, for exemplary purpose only, via heat sealing.

The valve is operable to a locked position and an unlocked position. In the locked position the valve permits air passage therethrough. When the valve is in the unlocked position, it prevents air exiting the air bag through the valve since the spring extends the insert toward the external end until the o-ring seals against the chamfer. However, in its unlocked position, the valve permits air passage therethrough when adequate elevated air pressure from the end of the valve that is outside the bag urges the insert in the valve to move toward the bag end of the valve body which is disposed inside the bag.

The valve is assembled by inserting the spring into the valve body, disposing the insert within the spring, securing the o-ring on the first end, thereby sealing the valve body to the air bag. The air bag is inflated via an air hose having a connector that is removably secured to the valve body, and subsequently passing pressurized air through the air hose to the valve and ultimately to the interior of the air bag. The air bag is deflated by inserting the circular edge of a coin into the diametrically-opposed slots, urging the insert in the direction of the ledge to compress the spring, turning the coin to move the insert into a locked position, engaging the insert flange with the "L"-shaped grooves, and allowing air to expel from the air bag.

More specifically, the present invention is a valve for inflation and deflation of air bags, the valve having a body, an insert, an o-ring, a spring and a plate. The body comprises a base, an external end, a barrel having an inside with a detent on the exterior of the barrel, and a flange. The flange comprises a body flange diameter, a flange bottom and a flange top. The barrel comprises a groove, preferably a detent. The barrel comprises "L"-shaped grooves on the inside thereof. The "L"-shaped grooves comprise legs and feet. The barrel is dimensioned greater than, but approximately equal to, the diameter of a turning tool, such as, for exemplary purposes only, a coin. The base comprises a ledge having a chamfer and an inner diameter. The base further comprises raised ridges.

The insert comprises a first end, a second end, panels and openings. The openings are disposed between the panels, and the second end comprises a ridge diameter and a groove. The first end comprises a flange which has flange extensions and gaps that are disposed between the flange extensions. The flange extensions are dimensioned to cooperatively engage the feet of the "L"-shaped grooves. The groove on the second end is dimensioned to receive the o-ring. The insert further comprises slots that are diametrically opposed in pairs and extend from proximate the flange extensions to the interior at approximately a forty-five degree angle from the axis.

The o-ring comprises an inside diameter and an outside diameter. The groove on the second end is dimensioned to receive the inside diameter and removably secures the o-ring to the insert. The outside diameter is larger than the inner diameter of the ledge, thereby preventing the o-ring from moving past the ledge. Contact by the o-ring with the chamfer seals the valve, preventing fluid communication between the air bag and the inside of the valve body barrel.

The spring comprises a first end and a second end. The first end is disposed against, and restrained by, the ledge, and the second end is disposed against, and restrained by the flange of the insert. As the insert is depressed into the barrel, the spring is compressed. The plate comprises an inside dimension, an outside dimension, a bottom, a top and an aperture that is dimensioned to allow passage of the barrel into and through the aperture.

The valve is assembled by inserting the spring into the inside of the barrel, wherein the first end of the spring is retained by and against the ledge. The insert is disposed and slidably movable within the body and is disposed through the spring, compressing same. The second end extends past the base, and while doing so, the o-ring is installed on the groove. Upon release, the spring urges the insert toward the external end. The o-ring is restrained from movement past the ledge by the chamfer, thereby preventing separation of the insert from the body once assembled.

The valve is joined to the air bag by inserting the barrel through a fabric hole, such that the flange of the valve body is disposed within the interior of the air bag which is preferably made from an air-impervious fabric. The plate is disposed over the barrel and sealed to the air bag and the flange via heat sealing.

In use, the air hose connector is secured to the valve, engaging the valve body via the detent. Subsequently, the air bag is inflated from the air hose which provides air from a compressed air tank or the like.

As air is supplied against the insert via the connector at the external end, pressure urges movement of the insert in the direction of the flange bottom, creating an opening between the o-ring and the chamfer of the ledge. Upon cessation of air being supplied by removal of the connector, the spring urges the insert in the opposite direction, thereby sealing the o-ring against the chamfer, preventing air from exiting the air bag. Alternatively, the insert may be locked in an open position by engaging its flange with the "L"-shaped grooves, and air bag could be filled with air while the insert is so locked, followed rapidly by a subsequent unlocking of the insert from the "L"-shaped grooves to quickly seal the air within the air bag.

To remove air from the air bag, a coin having a circular edge is inserted into the diametrically-opposing slots cooperatively engaging same. Subsequently, the coin is pushed in the direction of the flange bottom, sliding the flange extensions down the legs of the "L"-shaped groove. Once the spring is compressed sufficiently to create an opening between the o-ring and the chamfer of the ledge, the coin is rotated to engage the flange extensions into the feet of the "L"-shaped grooves, thereby locking the insert in an open position to allow air to expel from the air bag.

The raised ridges are separated by vent gaps. When the air bag is deflated, the vent gaps provide access from the interior of the air bag to the valve, thereby preventing sealing off of the valve by portions of the air bag. Once the air bag is deflated, the coin is counter-rotated to free the flange extensions from the feet, the spring expands urging the insert towards the external end and the air bag is sealed by the o-ring contacting the chamfer.

Accordingly, a feature and advantage of the present invention is its ability to allow inflation of an air bag via air pressure opening of the valve.

Another feature and advantage of the present invention is its ability to allow deflation of the air bag when the valve is locked open by turning a common coin inserted into the valve insert.

Still another feature and advantage of the present invention is its ability to be easily affixed to an air bag.

Yet another feature and advantage of the present invention is its ability to self-seal upon completion of air bag inflation and subsequent removal of an air pressure source.

Yet still another feature and advantage of the present invention is its ability to prevent unwanted sealing off of the valve by portions of an air bag pouch during deflation.

These and other features and advantages of the present invention will become more apparent to one skilled in the art from the following description and claims when read in light of the accompanying drawings.

BRIEF DESCRIPTION OF THE SEVERAL VIEWS OF THE DRAWINGS

The present invention will be better understood by reading the Detailed Description of the Preferred Embodiment with reference to the accompanying drawing figures, in which like reference numerals denote similar structure and refer to like elements throughout, and in which:

FIG. 2A depicts a side perspective view of the valve of FIG. 1, shown in closed position with coin utilized for turning;

FIG. 2B is a side perspective view of the valve of FIG. 1, shown in open and locked position with coin utilized for turning;

FIG. 3 is a side perspective view of an o-ring component according to a preferred embodiment of the valve for inflation and deflation of FIG. 1;

FIG. 4 depicts an end perspective view of a body component according to a preferred embodiment of the valve for inflation and deflation of FIG. 1;

FIG. 5 is a side perspective view of an insert component according to a preferred embodiment of the valve for inflation and deflation of FIG. 1;

FIG. 6 depicts a side perspective view of a plate component according to a preferred embodiment of the valve for inflation and deflation of FIG. 1;

FIG. 7 depicts a side perspective view of a spring component according to a preferred embodiment of the valve for inflation and deflation of FIG. 1;

FIG. 8 is an exploded perspective view of the valve for inflation and deflation of FIG. 1, according to a preferred embodiment;

FIG. 9A is an end perspective view of the valve for inflation and deflation of FIG. 1, according to a preferred embodiment, viewed from the external end; and FIG. 9B is an end perspective view of the valve for inflation and deflation of FIG. 1, according to a preferred embodiment, viewed from the flange bottom within the air bag interior.

DETAILED DESCRIPTION OF THE PREFERRED EMBODIMENT OF THE INVENTION

Figure 1:
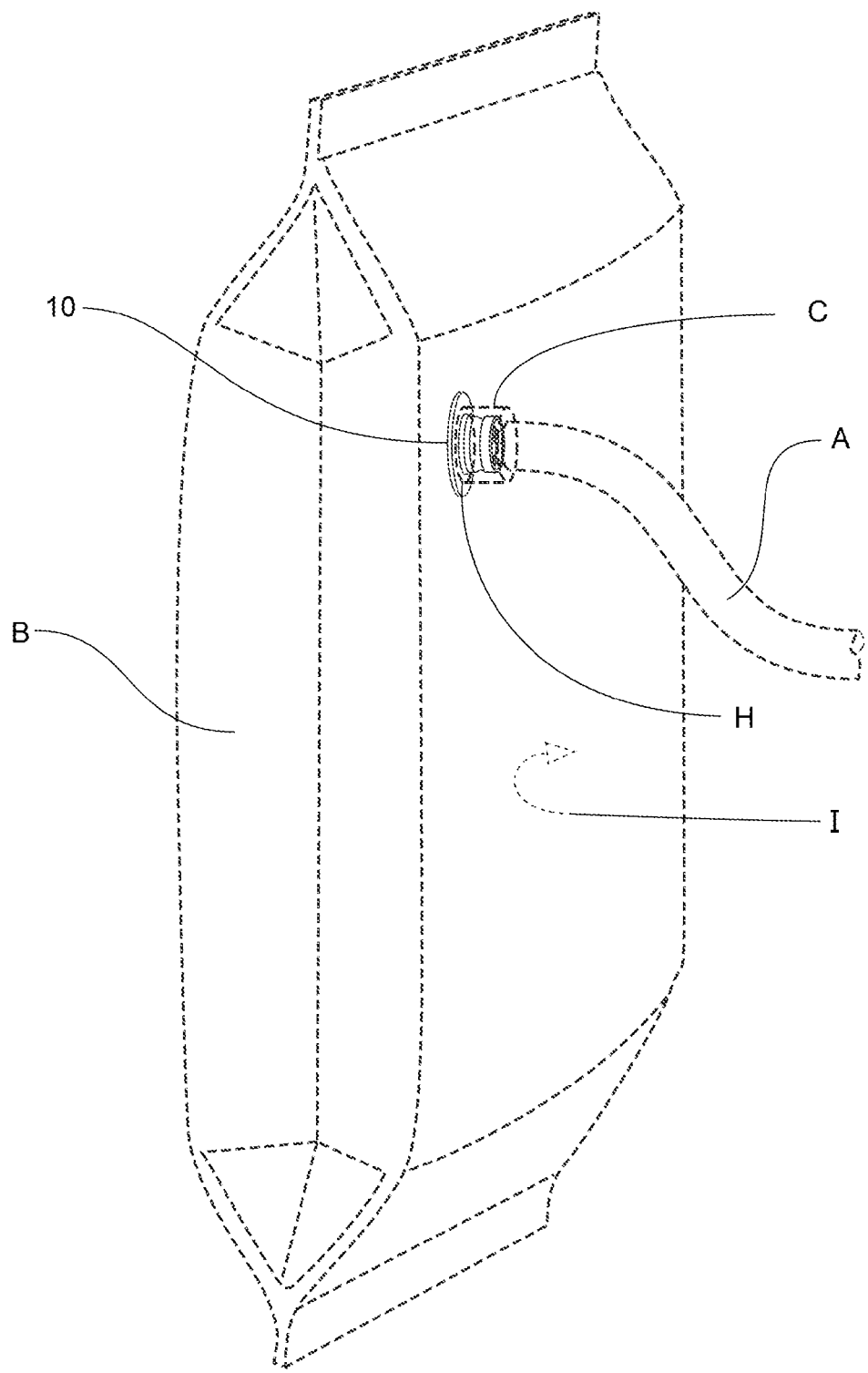
FIG. 1 is a perspective view of an air bag having a valve for inflation and deflation, according to a preferred embodiment.

In describing the preferred embodiment of the present invention, as illustrated in FIGS. 1-9B, specific terminology is employed for the sake of clarity. The invention, however, is not intended to be limited to the specific terminology so selected, and it is to be understood that each specific element includes all technical equivalents that operate in a similar manner to accomplish similar functions.

Referring now to FIGS. 1-9B, the present invention in a preferred embodiment is valve for inflation and deflation of air bags 10, wherein valve 10 comprises body 20, insert 30, o-ring 40, spring 50 and plate 60.

Body 20 comprises base 70, external end 27, barrel 26 having inside 29 and detent 85, and flange 25, wherein flange 25 comprises body flange diameter 21, flange bottom and flange top 23, and wherein barrel 26 comprises groove 24, and wherein groove 24 preferably comprises detent 85, and wherein inside 29 comprises "L"-shaped grooves 28 therewithin. "L"-shaped grooves 28 comprise legs 84 and feet 82 (best shown in FIG. 4). Barrel 26 is dimensioned greater than, but approximately equal to, diameter QD of a turning tool, such as, for exemplary purposes only, coin Q (best shown in FIGS. 2A and 2B). Base 70 comprises ledge 74 having chamfer 72 and inner diameter 73. Base 70 further comprises raised ridges 71.

Insert 30 comprises first end 32, second end 34, panels 35 and openings 36, wherein openings 36 are disposed between panels 35, and wherein second end 34 comprises ridge diameter 31 and groove 33, and wherein first end comprises flange 38. Flange 38 comprises flange extensions 39 and gaps 37, wherein gaps 37 are disposed between flange extensions 39. Flange extensions 39 are dimensioned to cooperatively engage feet 82 of "L"-shaped grooves 28. Groove 33 is dimensioned to receive o-ring 40. Insert 30 further comprises diametrically opposed slots 45, wherein diametrically opposed slots 45 extend from proximate flange extensions 39 to interior 46 (best shown in FIG. 5) at approximately a forty-five degree angle from axis 80 (best shown in FIG. 8).

O-ring 40 comprises inside diameter 41 and outside diameter 42, wherein groove 33 is dimensioned to receive inside diameter 41 and removably secures o-ring 40 to insert 30, and wherein outside diameter 42 is larger than inner diameter 73 of ledge 74, thereby preventing o-ring 40 from moving past ledge 74. Contact by o-ring 40 with chamfer 72 seals valve 10, preventing fluid communication between air bag B and inside 29.

Spring 50 comprises first end 52 and second end 54. First end 52 is disposed against, and restrained by, ledge 74, and second end 54 is disposed against, and restrained by flange 38, wherein as insert 30 is depressed into barrel 26, spring 50 is compressed.

Plate 60 comprises inside dimension 61, outside dimension 62, bottom 63, top 64 and aperture 65, wherein inside dimension 61 is dimensioned to allow passage of barrel 26 into and through aperture 65.

Valve 10 is assembled by inserting spring 50 into inside 29 of barrel 26, wherein first end 52 of spring 60 is retained by and against ledge 74. Insert 30 is disposed and slidably movable within body 20, wherein insert 30 is disposed through spring 50 compressing same as described further hereinabove, wherein second end 34 extends past base 70, and wherein while second end 34 is extended past base 70, o-ring 40 is installed on groove 33. Upon release of compressive forces, spring 50 urges insert 30 toward external end 27, wherein o-ring 40 is restrained from movement past ledge 74 by chamfer 72, thereby preventing separation of insert 30 from body 20 once valve 10 assembled.

Valve 10 is joined to air bag B by inserting barrel 26 through fabric hole H, wherein flange 25 is disposed within interior I of air bag B (best shown in FIG. 1). Air bag B is preferably made from an air-impervious fabric. Plate 60 is disposed over barrel 26 and sealed to air bag B and flange 25, preferably, without limitation, via heat sealing.

In use, connector C is secured to valve 10, wherein connector C is dimensioned to engage body 20 via detent 85, wherein connector C is, for exemplary purposes only, a quick disconnect as is known in the art. Subsequently, air bag B is inflated from air hose A, wherein air hose A is well-known in the art for supplying air from an air source, such as, for exemplary purposes only, a compressed air tank.

As air is supplied against insert 30 via connector C at external end 27, pressure urges movement of insert 30 in the direction of flange bottom 22, creating an opening between o-ring 40 and chamfer 72 of ledge 74. Upon cessation of air being supplied, such as, for exemplary purposes only, via removal of connector C, spring 50 urges insert in the opposite direction, thereby sealing o-ring 40 against chamfer 72 and preventing air from exiting air bag B. Insert 30 is alternatively locked in an open position by engaging flange 38 with "L"-shaped grooves 28, and air bag B is filled with air whilst insert 30 is so locked, followed by rapid subsequent unlocking of insert 30 from "L"-shaped grooves 28 to quickly seal air within air bag B.

To remove air from air bag B, coin Q having circular edge E is inserted into diametrically-opposing slots 45, wherein circular edge E cooperatively engages diametrically-opposed slots 45. Subsequently, coin Q is pushed in the direction of flange bottom 22, sliding flange extensions 39 down legs 84 of "L"-shaped groove 28. Once spring 50 is compressed sufficiently to create an opening between o-ring 40 and chamfer 72 of ledge 74, coin Q is rotated to engage flange extensions 39 into feet 82 of "L"-shaped grooves 28, thereby locking insert 30 in open position to allow air to expel from air bag B.

Raised ridges 71 are separated by vent gaps 76. When air bag B is deflated, vent gaps 76 provide access from interior of air bag B to valve 10, thereby preventing sealing off of valve 10 by portions of air bag B. Once air bag B is deflated, coin Q is counter-rotated to free flange extensions 39 from feet 82, wherein spring 50 expands, urging insert 30 towards external end 27, thereby sealing air bag B once again.

The foregoing description and drawings comprise illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions and the associated drawings. Although specific terms may be employed herein, they are used in a generic and descriptive sense only and not for purposes of limitation. Accordingly, the present invention is not limited to the specific embodiments illustrated herein, but is limited only by the following claims.

What is claimed is:

1. A method of inflating and deflating air bags, said method comprising the steps of:

inserting a spring into a valve body, wherein said valve body comprises an inside defined at a bag end of said valve body by a ledge having in inner diameter;

disposing an insert against said spring, wherein said insert extends through said inside, and wherein said insert comprises a first end and a second end, said insert having panels disposed therebetween said first end and said second end, said panels having openings disposed between said panels, and wherein said first end having diametrically-opposed longitudinal slots positioned on an inside of said insert is dimensioned to cooperatively engage a circular edge of a turning tool;

securing an o-ring to said second end comprising an outside diameter on said first end, wherein said outside diameter is greater than said inner diameter;

sealing said valve body to an air bag; and inflating the air bag via an air hose having a connector removably secured to said valve body.

2. The method of claim 1, wherein said insert further comprises a flange, said method further comprising the steps of:

inserting the circular edge of the turning tool into said diametrically-opposed slots;

urging said insert in the direction of said ledge, wherein said spring is compressed;

turning the turning tool to move said insert into a locked position;

allowing air to expel from the air bag.

3. The method of claim 2, wherein said inside of said body comprises "L"-shaped grooves, said method further comprising the step of:

engaging said flange with said "L"-shaped grooves.

4. The method of claim 2, wherein said step of inserting the circular edge of the turning tool further comprises the step of:

inserting a coin into said diametrically-opposed slots.

* * * * *